(12) United States Patent
Hayata et al.

(10) Patent No.: US 7,888,409 B2
(45) Date of Patent: Feb. 15, 2011

(54) AROMATIC POLYCARBONATE RESIN COMPOSITION

(75) Inventors: Yusuke Hayata, Chiba (JP); Akio Nodera, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 80 days.

(21) Appl. No.: 12/300,962

(22) PCT Filed: Mar. 28, 2007

(86) PCT No.: PCT/JP2007/056617

§ 371 (c)(1),
(2), (4) Date: Nov. 14, 2008

(87) PCT Pub. No.: WO2007/132596

PCT Pub. Date: Nov. 22, 2007

(65) Prior Publication Data

US 2009/0192257 A1    Jul. 30, 2009

(30) Foreign Application Priority Data

May 15, 2006    (JP)    ............... 2006-135408

(51) Int. Cl.
   *C08J 9/32*    (2006.01)
(52) U.S. Cl. .................................... 523/218
(58) Field of Classification Search ............ 523/218
   See application file for complete search history.

(56) References Cited

U.S. PATENT DOCUMENTS

| 2004/0211942 A1 | 10/2004 | Clark et al. |
| 2005/0070657 A1 | 3/2005 | Elkovitch et al. |
| 2006/0036035 A1 | 2/2006 | Govaerts et al. |

FOREIGN PATENT DOCUMENTS

| JP | 2000 17085 | 1/2000 |
| JP | 2001 288370 | 10/2001 |
| JP | 2005 048066 | 2/2005 |
| JP | 2005 048067 | 2/2005 |
| JP | 2005 515932 | 6/2005 |
| JP | 2005 272808 | 10/2005 |
| JP | 2006 77240 | 3/2006 |
| JP | 2006 111858 | 4/2006 |
| WO | 2004 097852 | 11/2004 |
| WO | 2005 034144 | 4/2005 |
| WO | 2005 108489 | 11/2005 |

*Primary Examiner*—Edward J Cain
(74) *Attorney, Agent, or Firm*—Oblon, Spivak, McClelland, Maier & Neustadt, L.L.P.

(57) ABSTRACT

Provided is a polycarbonate resin composition which is excellent in flame retardancy and heat resistance, while being improved in fluidity and reduced in molding shrinkage rate. Specifically, provided is an aromatic polycarbonate resin composition containing 100 parts by mass of an aromatic polycarbonate resin (A) and 0.1 to 50 parts by mass of a cenosphere (B).

7 Claims, No Drawings

AROMATIC POLYCARBONATE RESIN COMPOSITION

TECHNICAL FIELD

The present invention relates to an aromatic polycarbonate resin composition which is excellent in flame retardancy and heat resistance. The aromatic polycarbonate resin composition can be used in an office automation field, an information and telecommunications field, a home electric appliance field, an automobile field, an architectural field, and the like.

BACKGROUND ART

In recent years, from the viewpoint of a concern for the environment, an aromatic polycarbonate (hereinafter, may be abbreviated as aromatic PC) resin formed by using recycled resources has been drawing attention. On the other hand, a cenosphere is lightweight and excellent in heat resistance; thus, the cenosphere is drawing attention as a raw material of a plastic filler, a light-weight aggregate of a refractory and the like, a sound absorbing material, and a heat insulating material, and has been conventionally used as a filler of a ceramic material. Patent Document 1 discloses a technology of imparting sufficient rigidity to a brittle ceramic layer without sacrificing the weight thereof by using a low density filler containing the cenosphere. Further, Patent Document 2 discloses an environmentally-friendly resin composition in which moldability and heat resistance of a polyester film are improved by adding coal ash to a polyester resin. Still more, Patent Document 3 discloses a plastic film formed of a resin composition in which a thermoplastic resin is blended with fly ash as coal ash.

However, there is no specific disclosure relating to the flame retardancy of the resin in any of Patent Documents 1 to 3. Regarding the flame retardancy, Patent Document 4 discloses a flame-retardant resin composition containing a polycarbonate resin and fly ash, but there is no description on the flame retardancy when a polyester resin is included in the resin composition, and a particle diameter of fly ash is limited to 10 μm or less.

Patent Document 1: JP 2005-515932 A
Patent Document 2: JP 2001-288370 A
Patent Document 3: JP 2000-017085 A
Patent Document 4: JP 2005-272808 A

DISCLOSURE OF THE INVENTION

Problems to be Solved by the Invention

The present invention has been made in view of the above circumstances, and an object of the present invention is to provide a polycarbonate resin composition which is excellent in flame retardancy and heat resistance, while being improved in fluidity and reduced in molding shrinkage rate.

Means for Solving the Problems

The inventors of the present invention have intensively studied and found that a cenosphere having a hollow spherical form which is included in fly ash and the like of industrial wastes discharged from thermal power plants and the like is added, as a filler, to the aromatic PC resin, and hence an aromatic PC resin composition can be obtained, in which an increase in a specific gravity that generally occurs by filling of a filler is suppressed and flame retardancy and heat resistance are improved. Further, the inventors have also found that chemical resistance and fluidity of the aromatic PC resin composition are improved by adding a styrene resin and/or a polyester resin thereto. The present invention has been accomplished based on those findings.

That is, the present invention provides the following aromatic polycarbonate resin composition.

1. An aromatic polycarbonate resin composition comprising 100 parts by mass of an aromatic polycarbonate resin (A) and 0.1 to 50 parts by mass of a cenosphere.
2. The aromatic polycarbonate resin composition according to the item 1, further comprising 100 parts by mass or less of a styrene resin and/or a polyester resin (C).
3. The aromatic polycarbonate resin composition according to the item 2, wherein the polyester resin serving as a component (C) is an aliphatic polyester.
4. The aromatic polycarbonate resin composition according to the item 3, wherein the aliphatic polyester is a polylactic acid and/or a copolymer of a lactic acid and another hydroxycarboxylic acid.
5. The aromatic polycarbonate resin composition according to any one of the items 1 to 4, further comprising 10 parts by mass or less of a hydrolysis inhibitor (D).
6. The aromatic polycarbonate resin composition according to any one of the items 1 to 5, further comprising 100 parts by mass or less of an inorganic filler (E) other than a component (B).
7. The aromatic polycarbonate resin composition according to any one of the items 1 to 6, which is used for an office automation apparatus, an information and telecommunications device, an automobile part, an architectural member, or a home electric appliance.

Effects of the Invention

By compounding the cenosphere with the aromatic PC resin, a PC resin composition in which an increase in a specific gravity is suppressed, flame retardancy and heat resistance are improved, and molding shrinkage rate is reduced can be obtained. Further, by compounding the styrene resin and/or the polyester resin, a PC resin composition in which chemical resistance and fluidity of the resin composition are improved can be obtained.

BEST MODE FOR CARRYING OUT THE INVENTION

As an aromatic PC resin serving as a component (A) used in an aromatic PC resin composition of the present invention, an aromatic PC resin having an end group represented by the following general formula (1), for example, is given:

[Chem 1]

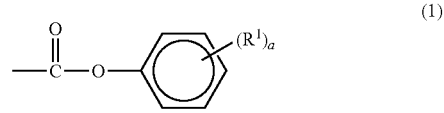

where: $R_1$, which may be linear or branched, represents an alkyl group having 1 to 35 carbon atoms and the position of $R^1$ on the benzene ring may be p-, m-, or o-position of which the p-position is preferred; and a represents an integer of 0 to 5. A viscosity average molecular weight of the aromatic PC resin is generally 10,000 to 40,000, and from the viewpoint of imparting heat resistance, flame retardancy, and impact resistance thereto, the viscosity average molecular weight is preferably 13,000 to 30,000 and more preferably 15,000 to 24,000.

Note that the viscosity average molecular weight (Mv) is the value obtained by determining the viscosity of a methylene chloride solution at 20° C. by using an Ubbelohde viscometer to obtain an intrinsic viscosity [η] therefrom, and by calculating the following equation: $[\eta]=1.23\times10^{-5} Mv^{0.83}$.

The aromatic polycarbonate having the end group represented by the general formula (1) can be easily produced by reacting a dihydric phenol with phosgene or a carbonate compound. That is, the aromatic polycarbonate can be produced, for example, in a solvent such as methylene chloride and under the presence of a catalyst such as triethylamine and a specific end terminator, by: a reaction between a dihydric phenol and a carbonate precursor such as phosgene; a transesterification between a dihydric phenol and a carbonate precursor such as diphenyl carbonate; or the like.

Here, a compound represented by the following general formula (2) is exemplified as the dihydric phenol:

[Chem 2]

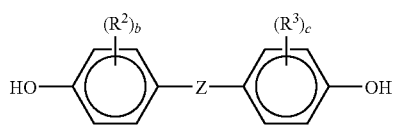

(2)

where: $R^2$ and $R^3$, which may be identical to or different from each other, each represent an alkyl group having 1 to 6 carbon atoms or a phenyl group; Z represents a single bond, an alkylene group having 1 to 20 carbon atoms, an alkylidene group having 2 to 20 carbon atoms, a cycloalkylene group having 5 to 20 carbon atoms, a cycloalkylidene group having 5 to 20 carbon atoms, —SO$_2$—, —SO—, —S—, —O—, or —CO—, with an isopropylidene group being preferred; and b and c each represent an integer of 0 to 4 and preferably 0.

Examples of the dihydric phenol compound represented by the general formula (2) include 4,4'-dihydroxydiphenyl; bis(4-hydroxyphenyl)alkanes such as 1,1-bis(4-hydroxyphenyl)methane, 1,1-bis(4-hydroxyphenyl)ethane, and 2,2-bis(4-hydroxyphenyl)propane; bis(4-hydroxyphenyl)cycloalkanes; bis(4-hydroxyphenyl)oxides; bis(4-hydroxyphenyl)sulfides; bis(4-hydroxyphenyl)sulfones; bis(4-hydroxyphenyl) sulfoxides; and bis(4-hydroxyphenyl) ketones. Of those, 2,2-bis(4-hydroxyphenyl)propane (bisphenol A) is preferred. Those dihydric phenols may be used alone or in combination of two or more kinds.

The dihydric phenol may be a homopolymer of one kind of the afore-mentioned dihydric phenols or a copolymer of two or more kinds of the dihydric phenols. The dihydric phenol may also be a thermoplastic random branched polycarbonate which is produced from any of the afore-mentioned dihydric phenols and a polyfunctional aromatic compound.

Examples of the carbonate compound include diaryl carbonates such as diphenyl carbonate and dialkyl carbonates such as dimethyl carbonate and diethyl carbonate.

As the end terminator, a phenol compound in which the end group represented by the general formula (1), that is, a phenol compound represented by the following general formula (3) may be used:

[Chem 3]

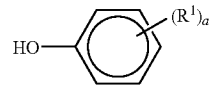

(3)

where: $R^1$ represents an alkyl group having 1 to 35 carbon atoms; and a represents an integer of 0 to 5.

Examples of the phenol compound include phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol, tetratriacontylphenol, and p-tert-pentylphenol. Those phenols may be used alone or in mixture of two or more kinds. In addition to those phenol compounds, another phenol compound or the like may also be used if required.

The aromatic polycarbonate produced through the afore-mentioned method virtually has, at one end or both ends of the molecule, an end group represented by the above general formula (1).

In the present invention, the aromatic polycarbonate resin serving as the component (A) is preferably an aromatic polycarbonate-polyorganosiloxane copolymer (hereinafter may be abbreviated as aromatic PC-POS copolymer) from the viewpoints of improving heat resistance, flame retardancy, and impact resistance. From those viewpoints, a polycarbonate-polydimethylsiloxane copolymer in which POS represents polydimethylsiloxane and polydimethylsiloxane has a chain length (n) of 30 to 120 is preferred as the aromatic PC-POS copolymer.

The aromatic PC-POS copolymer has an end group represented by the following general formula (4):

[Chem 4]

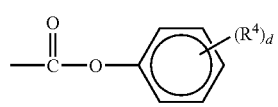

(4)

where: $R^4$ represents an alkyl group having 1 to 35 carbon atoms; and d represents an integer of 0 to 5.

Examples of the copolymer include those disclosed in Japanese Patent Application Laid-open Nos. Shouwa 50-29695, Heisei 3-292359, Hei 4-202465, Heisei 8-81620, Heisei 8-302178, and Heisei 10-7897. The alkyl group having 1 to 35 carbon atoms represented by $R^4$ may be linear or branched, and the position of $R^4$ on the benzene ring may be p-, m-, or o-position of which the p-position is preferred.

As the aromatic PC-POS copolymer, a copolymer having, in the molecule, a polycarbonate moiety formed of a structural unit represented by the general formula (5) and a polyorganosiloxane moiety (segment) formed of a structural unit represented by the general formula (6) can be preferably exemplified:

[Chem 5]

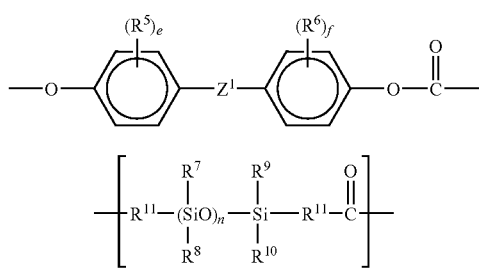

where: $R^5$ and $R^6$, which may be identical to or different from each other, each represent an alkyl group having 1 to 6 carbon atoms or a phenyl group; $R^7$ to $R^{10}$, which may be identical to or different from each other, each represent an alkyl group having 1 to 6 carbon atoms or a phenyl group, with a methyl group being preferred; $R^{11}$ represents an aliphatic or an aromatic divalent organic residue, with an o-arylphenol residue, a p-hydroxystyrene residue, and an eugenol residue being preferred;

$Z^1$ represents a single bond, an alkylene group having 1 to 20 carbon atoms, an alkylidene group having 2 to 20 carbon atoms, a cycloalkylene group having 5 to 20 carbon atoms, a cycloalkylidene group having 5 to 20 carbon atoms, $—SO_2—$, $—SO—$, $—S—$, $—O—$, or $—CO—$, with an isopropylidene group being preferred; e and f represents an integer of 0 to 4, and preferably 0; and n represents an integer of 1 to 500, preferably 5 to 200, more preferably 15 to 300, and still more preferably 30 to 120.

The aromatic PC-POS copolymer can be produced through, for example, the following procedure. Specifically, a polycarbonate oligomer (hereinafter abbreviated as PC oligomer) which has been produced in advance and which forms a polycarbonate moiety and a polyorganosiloxane (reactive PORS) which has at its end a reactive group such as an o-arylphenol group, a p-hydroxystyrene group, or an eugenol residue and which forms a polyorganosiloxane moiety (segment) are dissolved in a solvent such as methylene chloride, chlorobenzene, or chloroform. To the solution, an aqueous caustic alkali solution of a dihydric phenol and, as a catalyst, a tertiary amine (e.g., triethylamine) or a quaternary ammonium salt (e.g., trimethylbenzylammonium chloride) are added. Interfacial polycondensation is performed in the presence of a typical end terminator composed of a phenol compound represented by the general formula (7):

[Chem 6]

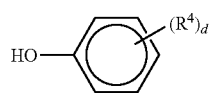

where: $R^4$ represents an alkyl group having 1 to 35 carbon atoms; and d represents an integer of 0 to 5. Examples of the phenol compound include the same compounds as exemplified in the general formula (3). The polyorganosiloxane moiety (segment) is preferably 0.2 to 10 mass % with respect to the aromatic PC-POS copolymer, and the content of the polyorganosiloxane moiety (segment) is preferably 0.1 to 5 mass % in the PC resin composition of the present invention.

The PC oligomer which is used for producing an aromatic PC-POS copolymer can be easily produced, for example, in a solvent such as methylene chloride by reacting a dihydric phenol with phosgene or a carbonate precursor such as a carbonate compound. Here, examples of the dihydric phenol to be used include the same compounds as exemplified in the general formula (2), and of those, 2,2-bis(4-hydroxyphenyl) propane (bisphenol A) is preferred.

The PC oligomer can be produced, for example, in a solvent such as methylene chloride by: a reaction between a dihydric phenol and a carbonate precursor such as phosgene; a transesterification between a dihydric phenol and a carbonate precursor such as diphenyl carbonate; or the like.

Further, examples of the carbonate compound include diaryl carbonates such as diphenyl carbonate and dialkyl carbonates such as dimethyl carbonate and diethyl carbonate.

The PC oligomer which is used for producing an aromatic PC-POS copolymer may be a homopolymer of one kind of the afore-mentioned dihydric phenols or a copolymer of two or more kinds of the dihydric phenols. The PC oligomer may also be a thermoplastic random branched polycarbonate which is produced from any of the afore-mentioned dihydric phenols and a polyfunctional aromatic compound.

In the above case, a branching agent (polyfunctional aromatic compound) such as 1,1,1-tris(4-hydroxyphenyl) ethane, α,α',α''-tris(4-hydroxyphenyl)-1,3,5-triisopropylbenzene, 1-[α-methyl-α-(4'-hydroxyphenyl)ethyl]-4-[α',α'-bis(4''-hydrox ylphenyl)ethyl]benzene, phloroglucine, trimellitic acid, or isatinbis(o-cresol) can be employed.

The aromatic PC-POS copolymer can be produced in the afore-mentioned manner. However, an aromatic PC is generally by-produced. Thus, an aromatic polycarbonate containing the aromatic PC-POS copolymer is produced. The aromatic PC-POS copolymer produced through the afore-mentioned method virtually has, at one end or both ends of the molecule, an aromatic end group represented by the general formula (4).

The cenosphere serving as a component (B) to be used in the PC resin composition of the present invention is spherical glass fine particles which are hollow and lightweight and each have a particle diameter of several hundred μm or less. The cenosphere is generated by being expanded through a catalytic action of iron dioxide, which is a component contained in coal ash, at the same time as the coal ash is exposed to high temperature in a boiler, whereby the resultant becomes a spherical form in an inner side of which $CO_2$ gas and $N_2$ gas are present. Further, the presence of iron (III) oxide ($Fe_2O_3$) is essential in generating the cenosphere, and iron (III) oxide occupies 5 to 8 mass % of the component of the cenosphere.

In some cases, an apparent specific gravity of the cenosphere is smaller than that of water, so there can be seen that the cenosphere floats on a discarding place of ash in a coal thermal power plant. A generation amount of the cenosphere differs depending on operating conditions of each boiler at the power plant, but in general, the generation amount of the cenosphere occupies 0.01 to 4.8 mass % of fly ash.

The cenosphere has features in that a content of silica ($SiO_2$) therein is larger than that in the fly ash, and a content of calcium therein is smaller than that in the fly ash. The most remarkable physical properties of the cenosphere are that the cenosphere has low density and low heat conductivity. In the aromatic resin composition of the present invention, the cenosphere serving as the component (B) has an average particle diameter of generally about 20 to 300 μm, and preferably 40 to 200 μm.

In the PC resin composition of the present invention, the cenosphere serving as the component (B) is required to have a content of 0.1 to 50 parts by mass and preferably 2 to 40 parts by mass with respect to 100 parts by mass of the aromatic PC resin serving as the component (A). When the content of the component (B) is 0.1 part by mass or more, a PC resin composition having sufficient flame retardancy and heat resistance can be obtained, and when the content of the component (B) is 50 parts by mass or less, flame retardancy, heat resistance, and mechanical strength of the PC resin composition of the present invention become sufficient.

The PC resin composition of the present invention preferably include a styrene resin and/or a polyester resin serving as a component (C) in addition to the component (A) and the component (B), from the viewpoint of improving chemical resistance and flowability of the PC resin composition of the present invention.

Examples of the styrene resin include polymers which are produced through polymerization of a monomer or a monomer mixture containing a monovinyl aromatic monomer such as styrene or α-methylstyrene (20 to 100 mass %), a cyanovinyl monomer such as acrylonitrile or methacrylonitrile (0 to 60 mass %), and another vinyl monomer such as methyl (meth)acrylate or maleimide which is polymerizable with the above monomers (0 to 50 mass %). Specific examples of those polymers include polystyrene (GPPS) and acrylonitrile-styrene copolymer (AS resin).

Alternatively, rubber-modified styrene resin is preferably used as the styrene resin. A preferred rubber-modified styrene resin is a high-impact styrene resin formed through graft polymerization of at least a styrene monomer with a rubber. Examples of the rubber-modified styrene resins include a high-impact polystyrene (HIPS) formed through polymerization of a rubber such as polybutadiene with styrene; ABS resin formed through polymerization of polybutadiene with acrylonitrile and styrene; and MBS resin formed through polymerization of polybutadiene with methyl methacrylate and styrene. Those rubber-modified styrene resins may be used in combination of two or more kinds, and also used as a mixture with the afore-mentioned rubber-non-modified styrene resin.

A content of the rubber in the rubber-modified styrene resin is generally about 2 to 50 mass %, preferably 5 to 30 mass %, and more preferably 5 to 15 mass %. When the ratio of the rubber is 2 mass % or more, impact resistance thereof becomes sufficient, and when the ratio is 50 mass % or less, thermal stability does not decrease, whereby decrease in melt flowability, generation of gel, and coloring are suppressed. Specific examples of the afore-mentioned rubber include polybutediene, rubber polymers containing acrylate and/or methacrylate, styrene-butadiene-styrene rubber (SBS), styrene-butadiene rubber (SBR), butadiene-acryl rubber, isoprene rubber, isoprene-styrene rubber, isoprene-acryl rubber, and ethylene-propylene rubber. Of those, polybutadiene is particularly preferred. The polybutadiene employed in the present invention may be a low-cis polybutadiene (containing 1,2-vinyl bonding of 1 to 30 mol % and 1,4-cis bonding of 30 to 42 mol %, for example) or a high-cis polybutadiene (containing 1,2-vinyl bonding of 20 mol % or less and 1,4-cis bonding of 78 mol % or more, for example). A mixture of those butadienes may also be employed.

As the polyester resin serving as a component (C), any of an aliphatic polyester and an aromatic polyester can be employed. As the aliphatic polyester, a polylactic acid and/or a copolymer of a lactic acid and another hydroxycarboxylic acid can be preferably employed from the viewpoint of decreasing the environmental load.

The polylactic acid is synthesized by ring-opening polymerization from cyclic dimer of lactic acid, which is normally called lactide, and the production methods thereof are disclosed in U.S. Pat. Nos. 1,995,970, 2,362,511, 2,683,136, and the like.

Further, the copolymer of a lactic acid and another hydroxycarboxylic acid are normally synthesized by ring-opening polymerization from a cyclic ester intermediate of lactide and hydroxycarboxylic acid and the production methods thereof are disclosed in U.S. Pat. Nos. 3,635,956, 3,797, 499, and the like.

When a lactic acid resin is produced by direct dehydration polycondensation rather than by ring-opening polymerization, a lactic acid resin with a suitable degree of polymerization for the present invention can be obtained by the polymerization through methods of: performing azeotropic dehydration condensation of a lactic acid and, if required, another hydroxycarboxylic acid, in the presence of, preferably an organic solvent, particularly a phenyl ether solvent; and particularly preferably removing water from the solvent after azeotropic distillation and by returning the solvent, which contains substantially no water, to the reaction system.

For the lactic acid as raw material, any of L- and D-lactic acids, a mixture thereof, or lactide which is a dimer of lactic acid can be employed.

Further, examples of the another hydroxycarboxylic acid which can be used in combination with the lactic acid include glycolic acid, 3-hydroxybutyric acid, 4-hydroxybutyric acid, 4-hydroxyvaleric acid, 5-hydroxyvaleric acid, and 6-hydroxycaproic acid, and, further include a cyclic ester intermediate of hydroxycarboxylic acid such as glycolide, which is a dimer of glycolic acid, or ε-caprolacton, which is a cyclic ester of 6-hydroxycaproic acid.

When producing a lactic acid resin, a suitable molecular weight controlling agent, chain branching agent, and another modifying agent may be compounded.

The lactic acids and the hydroxycarboxylic acids as copolymer components may be used alone or two or more kinds thereof and, further, the obtained lactic acid resins may be used in combination of two or more kinds thereof.

The aliphatic polyester of the component (C) to be used in the present invention preferably has large molecular weight from the viewpoints of thermal and mechanical physical properties, and, an aliphatic polyester having an average molecular weight of 30,000 or more is preferred.

Further, as the aliphatic polyester, a polylactic acid is preferred from the viewpoints of durability, rigidity, and biological decomposability.

The aromatic polyester resin of the component (C) to be used in the present invention is a polymer or a copolymer obtained by condensation reaction of, as main components, an aromatic dicarboxylic acid or a reactive derivative thereof and a diol or an ester derivative thereof.

As the aromatic dicarboxylic acid, an aromatic dicarboxylic acid such as terephthalic acid, isophthalic acid, orthophthalic acid, 1,5-naphthalenedicarboxylic acid, 2,6-naphthalenedicarboxylic acid, 4,4'-biphenyl dicarboxylic acid, 4,4'-biphenyletherdicarboxylic acid, 4,4'-biphenylmethanedicarboxylic acid, 4,4'-biphenylsulfonedicarboxylic acid, 4,4'-biphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, or 2,5-pyridinedicarboxylic acid can be preferably employed. Of those, terephthalic acid and 2,6-naphthalenedicarboxylic acid are particularly preferred.

The aromatic dicarboxylic acids may be used in a mixture of two or more kinds thereof. Further, if in small amount, one or more kinds of aliphatic dicarboxylic acids such as adipic acid, azelaic acid, sebacic acid, and dodecane diacid, and alicyclic dicarboxylic acids such as cyclohexanedicarboxylic acid may be used in a mixture with the aromatic dicarboxylic acid.

Further, examples of the diol which is a component of the aromatic polyester of the present invention include: aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol, and triethylene glycol; alicyclic diols such as 1,4-cyclohexanedimethanol; diols containing aromatic rings such as 2,2-bis(β-hydroxyethoxyphenyl)propane; and mixtures thereof. In addition, if in small amount, one or more kinds of long chain diols having molecular weight of 400 to 6,000, that is, polyethylene glycol, poly-1,3-propylene glycol, and polytetramethylene glycol, may be copolymerized.

Further, the aromatic polyester to be used in the present invention can be branched by introducing a small amount of branching agent. A kind of the branching agent is not particularly limited, but examples thereof include trimesic acid, trimellitic acid, trimethylolethane, trimethylolpropane, and pentaerythritol.

As specific aromatic polyester resins, there can be exemplified polyethylene terephthalate (PET), polypropylene terephthalate, polybutylene terephthalate (PBT), polyhexylene terephthalate, polyethylene naphthalate (PEN), polybutylene naphthalate (PBN), and polyethylene-1,2-bis(phenoxy)ethane-4,4'-dicarboxylate, and in addition, copolymer polyesters such as a polyethylene isophthalate/terephthalate copolymer and a polybutylene terephthalate/isophthalate copolymer.

Of those, polyethylene terephthalate, polybutylene terephthalate, polyethylene naphthalate, polybutylene naphthalate, and a mixture thereof, which are well-balanced in mechanical properties and the like, can be preferably used. In particular, the use of a mixture of polyethylene terephthalate and polybutylene terephthalate is preferred in the point that the balance between impact strength, fatigue strength, and chemical resistance can be obtained remarkably satisfactorily. A usage ratio (mass ratio) of polyethylene terephthalate to polybutylene terephthalate is preferably in a range of 40/60 to 95/5 and particularly preferably in a range of 50/50 to 90/10.

Further, end group structures of the obtained aromatic polyester resin are not particularly limited, and the structures may have a case where one of the hydroxyl group and the carboxylic group has a larger ratio than the other, in addition to the case where the ratio of the hydroxyl group and the carboxylic group is substantially equal. Further, those end groups may be sealed by being reacted with a compound having reactivity with respect to the end groups.

Regarding a production method for the aromatic polyester resin, the method is performed, in accordance with the conventional method, by: polymerizing dicarboxylic acid components and the afore-mentioned diol components while heating under the presence of a polycondensation catalyst containing titanium, germanium, antimony, and the like; and discharging by-produced water or lower alcohol out of the system. For example, as the germanium polymerization catalyst, oxides of germanium, hydroxides, halides, alcoholates, phenolates, or the like can be exemplified, and more specifically, germanium oxide, germanium hydroxide, germanium tetrachloride, tetramethoxygermanium, or the like can be exemplified.

Further, in the production method, compounds such as manganese, zinc, calcium, and magnesium, which are used in the conventionally known transesterification which is a step before the polycondensation, can also be used in combination. It is also possible that, after the transesterification is completed, the catalyst is deactivated by compounds and the like formed of phosphoric acid or phosphorous acid, to thereby perform polycondensation.

A molecular weight of the aromatic polyester resin is not particularly limited, and an intrinsic viscosity thereof when measured at 25° C. by using o-chlorophenol as a solvent is 0.4 to 1.2 dl/g and preferably 0.65 to 1.15 dl/g.

In the present invention, one kind or two or more kinds selected from the afore-mentioned aliphatic polyesters and aromatic polyesters can be used as the polyester resin. Of those, an aliphatic polyester is preferred, and a polylactic acid and/or a copolymer of a lactic acid and another hydroxycarboxylic acid is particularly preferred.

In the PC resin composition of the present invention, a content of the component (C) is, with respect to 100 parts by mass of the component (A), generally 100 parts by mass or less, and from the viewpoint of improving chemical resistance and flowability of the PC resin composition, the content is preferably 5 to 100 parts by mass and more preferably 10 to 85 parts by mass.

In the PC resin composition of the present invention, it is preferred that a hydrolysis inhibitor as a component (D) be included in addition to the component (A) and the component (B) from the viewpoint of moderately improving hydrolysis resistance of the PC resin composition. The hydrolysis resistance can be particularly improved by using the polyester resin serving as the component (C) and the hydrolysis inhibitor serving as the component (D) in combination.

Examples of the hydrolysis inhibitor include carbodiimide compounds, epoxy compounds, isocyanate compounds, oxazoline compounds, and oxazole compounds. Of those, carbodiimide compounds and epoxy compounds are preferred. A compounding amount of the component (D) is generally 10 parts by mass or less, preferably 0.01 to 10 parts by mass, more preferably 0.05 to 5 parts by mass, and still more preferably 0.05 to 3 parts by mass with respect to 100 parts by mass of the component (A). When the compounding amount of the component (D) is 0.01 part by mass or more, the hydrolysis resistance of the resin composition improves. Further, when the compounding amount is 10 parts by mass or less, dispersibility in the resin composition is satisfactory while the hydrolysis resistance is moderately improving, resulting in that there is no case where granular structures are generated or impact resistance is lowered.

In the PC resin composition of the present invention, it is preferred that an inorganic filler as a component (E) other than the cenosphere serving as the component (B) be included in addition to the component (A) and the component (B) from the viewpoint of improving bending elastic modulus (rigidity) of a cured product of the PC resin composition.

As the inorganic filler, at least one or more kinds selected from the following can be used: talc, mica, wallastonite, sepiolite, palite, attapulgite, perlite, silica fume, fly ash balloon, sericite, bentonite, alumina-silica ceramics fiber, rock wool, zirconium oxide, kaoline, montmorillonite, glass fiber, glass flake, and carbon fiber. An average diameter of the talc is generally about 2 to 40 μm and preferably 2 to 20 μm.

As the glass fiber, a fiber produced by using, as a raw material, alkali glass, low alkali glass, or non-alkali glass is preferred. A form of the fiber may be any of roving, milled fiber, chopped strand, and the like. Further, a diameter of the glass fiber is preferably 3 to 30 μm, and the fiber having a length of 1 to 6 mm is preferably used. When the diameter of the glass fiber is 3 μm or more, the PC resin composition becomes high in rigidity, and when the diameter thereof is 30 μm or less, an external appearance of a molded product becomes satisfactory. Regarding the length of the glass fiber, the glass fiber supplied into a kneader fractures at the time of kneading with the resin component, so it is better to fill the glass fiber into a pellet of the resin composition in such a manner that the fiber length of the glass fiber in the pellet is 0.01 to 2 mm and preferably 0.05 to 1 mm.

In order to improve adhesion of the glass fiber with the resin component, it is preferred that the glass fiber be treated by a surface treatment agent, the resultant thereafter subjected to convergence treatment by using a convergence agent be compounded to the component (A), and the mixture be melt-kneaded. Examples of the surface treatment agent of the glass fiber include: silane coupling agents such as aminosilane, epoxysilane, vinylsilane, and acrylsilane coupling agents; and coupling agents such as titanate, aluminum, chromium, zirconium, and boron coupling agents. Of those, silane coupling agents and titanate coupling agents are particularly preferably used. The surface treatment method may be a general aqueous solution method, organic solvent method, spray method, or the like. In addition, as the convergence agent to be used in the convergence treatment after the surface treatment, convergence agents such as urethane, acrylic, acrylonitrile-styrene copolymer, and epoxy coupling agents can be exemplified. The convergence treatment of the glass fiber by using those convergence agents may be performed by a known method such as immersion coating, roller coating, spray coating, flow coating, and spraying.

The glass flake can be produced with the same raw material as the glass fiber and can perform the surface treatment similarly. A size of the glass flake is not particularly limited, but a thickness thereof is preferably 3 to 30 μm, which is the same as the diameter of the glass fiber. When the molded product is required for dimensional accuracy thereof, it is preferred that the glass flake be used, and the glass flake be used in combination with the glass fiber and a carbon fiber.

As the carbon fiber, a cellulose fiber, an acrylic fiber, a lignin, a petroleum pitch, or a burned product using a coal pitch as a raw material are preferably used. In the carbon fiber, there are types, in accordance with burning conditions, such as flame-resistant, carbonaceous, and graphite carbon fibers, and any of those types may be used. Further, a form of the carbon fiber may be any of roving, milled fiber, and chopped strand. In addition, a diameter of the fiber is preferably 5 to 15 μm, and a length of the fiber, that is, a length of the fiber when filled in the pellet of the aromatic PC resin composition, is preferably in a range of 0.01 to 1 mm. Further, the carbon fiber is preferably subjected to surface treatment by an epoxy resin or a urethane resin beforehand, because such a fiber is excellent in compatibility with the resin component.

A compounding amount of the inorganic filler serving as the component (E) is, with respect to 100 parts by mass of the aromatic PC resin serving as the component (A), generally 100 parts by mass or less, and from the viewpoint of improving rigidity and flame retardancy of the PC resin composition, the compounding amount is preferably 4 to 50 parts by mass and more preferably 10 to 40 parts by mass. When the compounding amount is 4 parts by mass or more, rigidity and flame retardancy of the PC resin composition improve, and when the compounding amount is 50 parts by mass or less, flowability of the PC resin composition is satisfactory and a molded product having satisfactory external appearance and strength can be obtained.

To the PC resin composition of the present invention, a flame retardant, a silicone compound, a fluorine resin, and the like can be added, as long as physical properties of the PC resin composition are not adversely affected.

The PC resin composition of the present invention can be obtained by compounding the afore-mentioned respective components by an ordinary method and then melt-kneading the components. In this case, the kneading is performed by a method using, for example, a ribbon blender, a Henschel mixer, a Banbury mixer, a drum tumbler, a single-screw extruder, a twin-screw extruder, a cokneader, or a multi-screw extruder. Heating temperature in melt-kneading is generally about 240 to 280° C.

The PC resin composition of the present invention can be formed into a molded product having excellent flame retardancy by employing a known molding method, for example, hollow molding, injection molding, extrusion molding, vacuum molding, pressure molding, heat bending molding, compression molding, calendar molding, or rotational molding. Molding temperature of the PC resin composition of the present invention also is generally about 240 to 280° C.

EXAMPLES

Hereinafter the present invention is described in more detail by way of examples, but the present invention is not limited thereto.

Examples 1 to 12 and Comparative Examples 1 to 10

After respective components shown in Tables I and Tables II were dried, the respective components were each compounded in a compounding amount (part(s) by mass) written in the tables and homogeneously blended by using a tumbler. The mixture was then supplied into a vented twin-screw extruder having a diameter of 35 mm (manufactured by Toshiba Machine Co., Ltd., model name: TEM35), was kneaded at temperature of 240° C., and was pelletized.

The obtained pellets were dried at 100° C. for 10 hours and were subjected to injection molding by using a injection molding machine under the condition that temperature of a cylinder was 240° C. and temperature of a die was 80° C., whereby desired test pieces were obtained. The performance of the PC resin composition were evaluated in accordance with the following various evaluation tests by using the obtained test pieces. The results are shown in Table I.

Compounding components which were used in the tests and performance evaluation methods are shown below.

[Compounding Components]
(A)-1: bisphenol A polycarbonate (A1500, manufactured by Idemitsu Kosan Co., Ltd., viscosity average molecular weight: 14,500)
(A)-2: silicone copolymerized polycarbonate (viscosity average molecular weight: 17,000, polydimethylsiloxane (PDMS) content: 4.0 mass %) prepared in accordance with Production Example 4 of Japanese Patent Application Laid-open No. 2002-12755
(B)-1: cenosphere 1 (E-SPHERES SL300, manufactured by Taiheiyo Cement Corporation, particle size range: 150 to 300 μm, average particle diameter: 175 μm)
(B)-2: cenosphere 2 (E-SPHERES SL75, manufactured by Taiheiyo Cement Corporation, particle size range: 20 to 75 μm, average particle diameter: 45 μm)

(C)-1: styrene resin: ABS resin (AT-05, manufactured by NIPPON A&L INC.)
(C)-2: polyester resin 1: polylactic acid resin (Lacea H-100, manufactured by Mitsui Chemicals, Inc.)
(C)-3: polyester resin 2: polybutyleneterephthalate (Toraycon 1100S, manufactured by Toray Industries, Inc.)
(D)-1: hydrolysis inhibitor 1: dicyclohexylcarbodiimide (Carbodilite LA-1, manufactured by Nisshinbo Industries, Inc.)
(D)-2: hydrolysis inhibitor 2: bisphenol A-type epoxy resin (EPICLON AM-040-P, manufactured by DIC Corporation)
(E)-1: inorganic filler 1: talc (TP-A25, manufactured by Fuji Talc Industrial Co., Ltd., average diameter: 5 μm)
(E)-2: inorganic filler 2: GF (MA409C, manufactured by Asahi Fiber Glass Co., Ltd., fiber diameter: 13 μm, fiber length: 3 mm)

[Performance Evaluation Method]

(1) Flame Retardancy

A vertical flame test was performed in accordance with UL 94 standard by using the produced test pieces each having a thickness of 1.6 mm (1/16 inch). The test pieces were evaluated into one of the classes of UL 94V-0, V-1, V-2, and V-2 out (low flame retardancy) based on the results of the test.

(2) Density of Molded Product

The density of the molded product was determined in accordance with ISO 1183 by using test pieces each having a thickness of 3.2 mm (1/8 inch) produced by an injection molding machine.

(3) Bending Modulus of Elasticity

The bending modulus of elasticity was calculated in accordance with ASTM D-790 standard by using test pieces each having a thickness of 4 mm and a length of 130 mm produced by an injection molding machine, by performing three-point bending test with distance between supports of 90 mm and loading rate of 20 mm/min and by determining the gradient of loading-warped curve thereof.

(4) Flowability

Spiral flow length (SFL) was determined under the conditions of molding temperature of 260° C., die temperature of 80° C., section thickness of 2 mm, width of 10 mm, and injection pressure of 8 MPa.

(5) Molding Shrinkage Rate

The shrinkage rates in machine direction (MD) and in transverse direction (TD) were determined by using corner plates each having a size of 100 mm×100 mm×2 mm produced by injection molding machine.

TABLE I

|  |  |  | Examples ||||||
|  |  |  | 1 | 2 | 3 | 4 | 5 | 6 |
|---|---|---|---|---|---|---|---|---|
| Compounding ratios | (A) | (A)-1 | 100 | 100 | 100 | 100 | 100 | 100 |
|  |  | (A)-2 |  |  |  |  |  |  |
|  | (B) | (B)-1 | 5 | 3 |  |  |  | 40 |
|  |  | (B)-2 |  |  | 0.5 | 5 | 10 |  |
|  | (C) | (C)-1 |  |  | 10 | 40 | 20 | 40 |
|  |  | (C)-2 |  |  | 10 |  |  |  |
|  |  | (C)-3 |  |  |  |  | 20 |  |
|  | (D) | (D)-1 |  |  |  | 1 |  |  |
|  |  | (D)-2 |  |  |  |  | 5 |  |
|  | (E) | (E)-1 |  |  |  |  |  | 15 |
|  |  | (E)-2 |  |  |  |  |  |  |
| Evaluations | Flame retardancy (1.6 mm) || V-2 | V-2 | V-2 | V-2 | V-2 | V-2 |
|  | Density of molded product [g/cm³] || 1.20 | 1.19 | 1.19 | 1.12 | 1.12 | 1.25 |
|  | Bending modulus of elasticity [MPa] || 2,400 | 2,400 | 2,600 | 2,400 | 2,600 | 2,800 |
|  | Flowability (SFL) [cm] || 20 | 24 | 26 | 30 | 35 | 35 |
|  | Molding shrinkage rate [%] | MD | 0.5 | 0.5 | 0.6 | 0.5 | 0.5 | 0.5 |
|  |  | TD | 0.6 | 0.6 | 0.7 | 0.5 | 0.5 | 0.5 |
|  |  |  | Examples ||||||
|  |  |  | 7 | 8 | 9 | 10 | 11 | 12 |
| Compounding ratios | (A) | (A)-1 | 100 | 100 | 70 | 80 | 50 | 60 |
|  |  | (A)-2 |  |  | 30 | 20 | 50 | 40 |
|  | (B) | (B)-1 |  | 5 |  | 10 | 10 | 20 |
|  |  | (B)-2 | 40 |  | 10 |  |  |  |
|  | (C) | (C)-1 |  | 25 | 25 |  |  |  |
|  |  | (C)-2 | 85 | 15 |  | 30 |  |  |
|  |  | (C)-3 |  |  |  |  | 30 | 30 |
|  | (D) | (D)-1 | 5 | 0.5 |  | 1 |  |  |
|  |  | (D)-2 |  |  |  |  | 3 | 3 |
|  | (E) | (E)-1 | 30 |  |  |  | 5 |  |
|  |  | (E)-2 |  |  |  |  |  | 10 |
| Evaluations | Flame retardancy (1.6 mm) || V-2 | V-2 | V-0 | V-0 | V-0 | V-0 |
|  | Density of molded product [g/cm³] || 1.35 | 1.22 | 1.15 | 1.21 | 1.23 | 1.25 |

TABLE I-continued

| | | | | | | |
|---|---|---|---|---|---|---|
| Bending modulus of elasticity [MPa] | 7,700 | 2,600 | 2,600 | 3,500 | 3,700 | 5,000 |
| Flowability (SFL) [cm] | 55 | 40 | 35 | 40 | 35 | 35 |
| Molding shrinkage rate [%] MD | 0.4 | 0.6 | 0.4 | 0.6 | 0.6 | 0.4 |
| Molding shrinkage rate [%] TD | 0.5 | 0.6 | 0.5 | 0.6 | 0.6 | 0.5 |

TABLE II

| | | | Comparative Examples | | | | |
|---|---|---|---|---|---|---|---|
| | | | 1 | 2 | 3 | 4 | 5 |
| Compounding ratios | (A) | (A)-1 | 100 | 100 | 100 | 100 | 60 |
| | | (A)-2 | | | | | 40 |
| | (B) | (B)-1 | | | | | |
| | | (B)-2 | | | | | |
| | (C) | (C)-1 | | 10 | | | |
| | | (C)-2 | | | | | |
| | | (C)-3 | | | 10 | 10 | 30 |
| | (D) | (D)-1 | | | | | |
| | | (D)-2 | | | | 1 | 3 |
| | (E) | (E)-1 | | | | 5 | |
| | | (E)-2 | | | | | 10 |
| Evaluations | Flame retardancy (1.6 mm) | | V-2 | V-2 out | V-2 out | V-2 | V-1 |
| | Density of molded product [g/cm³] | | 1.20 | 1.19 | 1.19 | 1.19 | 1.25 |
| | Bending modulus of elasticity [MPa] | | 2,300 | 2,200 | 2,400 | 2,700 | 4,000 |
| | Flowability (SFL) [cm] | | 15 | 20 | 22 | 20 | 35 |
| | Molding shrinkage rate [%] MD | | 0.7 | 0.7 | 0.8 | 0.7 | 0.5 |
| | Molding shrinkage rate [%] TD | | 0.7 | 0.8 | 0.9 | 0.7 | 0.6 |

| | | | Comparative Examples | | | | |
|---|---|---|---|---|---|---|---|
| | | | 6 | 7 | 8 | 9 | 10 |
| Compounding ratios | (A) | (A)-1 | 100 | 100 | 100 | 80 | 70 |
| | | (A)-2 | | | | 20 | 30 |
| | (B) | (B)-1 | 0.05 | | 65 | 70 | 0.05 |
| | | (B)-2 | | 60 | | | |
| | (C) | (C)-1 | | | 40 | | 25 |
| | | (C)-2 | | | | 30 | |
| | | (C)-3 | | | | | |
| | (D) | (D)-1 | | | | 1 | |
| | | (D)-2 | | | | | |
| | (E) | (E)-1 | | | 15 | | |
| | | (E)-2 | | | | | |
| Evaluations | Flame retardancy (1.6 mm) | | V-2 out | V-2 out | V-2 out | V-2 out | V-2 |
| | Density of molded product [g/cm³] | | 1.20 | 1.3 | 1.26 | 1.19 | 1.15 |
| | Bending modulus of elasticity [MPa] | | 2,300 | 2,600 | 2,800 | 3,500 | 2,500 |
| | Flowability (SFL) [cm] | | 16 | 25 | 30 | 45 | 30 |
| | Molding shrinkage rate [%] MD | | 0.7 | 0.7 | 0.6 | 0.7 | 0.7 |
| | Molding shrinkage rate [%] TD | | 0.7 | 0.7 | 0.6 | 0.7 | 0.8 |

From Tables I and Tables II, the followings became clear.

(1) Examples 1 to 12

The PC resin compositions each had low specific gravity and low molding shrinkage rate, and each were excellent in flame retardancy, impact resistance, and flowability.

(2) Comparative Examples 1 to 5

The PC resin compositions each had low flowability and high molding shrinkage rate, because the composition is not compounded with the cenosphere serving as the component (B).

(3) Comparative Examples 6 to 10

The PC resin composition each had low flame retardancy and high molding shrinkage rate, because the compounding amount of the cenosphere serving as the component (B) with respect to 100 parts by mass of the component (A) is out of the range of 0.1 to 50 parts by mass.

INDUSTRIAL APPLICABILITY

According to the present invention, the aromatic PC resin composition which is excellent in flame retardancy and heat resistance. The aromatic PC resin composition can be used in an office automation field, an information and telecommunications field, a home electric appliance field, an automobile field, and an architectural field.

The invention claimed is:

1. An aromatic polycarbonate resin composition comprising 100 parts by mass of an aromatic polycarbonate resin (A) and 0.1 to 50 parts by mass of a cenosphere (B).

2. The aromatic polycarbonate resin composition according to claim 1, further comprising 100 parts by mass or less of a styrene resin and/or a polyester resin (C).

3. The aromatic polycarbonate resin composition according to claim 2, wherein the polyester resin serving as the component (C) is an aliphatic polyester.

4. The aromatic polycarbonate resin composition according to claim 3, wherein the aliphatic polyester is a polylactic acid and/or a copolymer of a lactic acid and another hydroxycarboxylic acid.

5. The aromatic polycarbonate resin composition according to claim 1, further comprising 10 parts by mass or less of a hydrolysis inhibitor (D).

6. The aromatic polycarbonate resin composition according to claim 1, further comprising 100 parts by mass or less of an inorganic filler (E) other than the component (B).

7. The aromatic polycarbonate resin composition according to claim 1, which is used for an office automation apparatus, an information and telecommunications device, an automobile part, an architectural member, or a home electric appliance.

* * * * *